US010343670B2

(12) United States Patent
Niibe et al.

(10) Patent No.: US 10,343,670 B2
(45) Date of Patent: Jul. 9, 2019

(54) VEHICLE CONTROL APPARATUS FOR CONTROLLING CONTINUOUS COOPERATIVE OPERATION OF PLURALITY OF OPERATION DEVICES

(71) Applicant: MAZDA MOTOR CORPORATION, Hiroshima (JP)

(72) Inventors: Tadayuki Niibe, Yawatahama (JP); Naoki Yamada, Hiroshima (JP); Kazuhiro Takemura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 37 days.

(21) Appl. No.: 15/594,701

(22) Filed: May 15, 2017

(65) Prior Publication Data

US 2017/0334438 A1    Nov. 23, 2017

(30) Foreign Application Priority Data

May 18, 2016  (JP) ................................ 2016-099457

(51) Int. Cl.
*B60W 10/04* (2006.01)
*B60W 10/20* (2006.01)
(Continued)

(52) U.S. Cl.
CPC ........... *B60W 10/04* (2013.01); *B60K 26/021* (2013.01); *B60T 7/042* (2013.01); *B60T 8/17555* (2013.01);
(Continued)

(58) Field of Classification Search
CPC .... B60W 10/04; B60W 10/20; B60W 10/184; B60W 50/16; B60W 50/0098;
(Continued)

(56) References Cited

U.S. PATENT DOCUMENTS

| 2007/0205040 | A1 | 9/2007 | Miyasaka et al. |
| 2008/0015755 | A1* | 1/2008 | Kuwahara ............. B60W 10/04 701/48 |

(Continued)

FOREIGN PATENT DOCUMENTS

| CN | 101028831 A | 9/2007 |
| CN | 103223940 A | 7/2013 |

(Continued)

OTHER PUBLICATIONS

An Office Action issued by the Chinese Patent Office dated Jan. 30, 2019, which corresponds to Chinese Patent Application No. 201710341483.5 and is related to U.S. Appl. No. 15/594,701; with partial English language translation.

(Continued)

*Primary Examiner* — Yazan A Soofi
(74) *Attorney, Agent, or Firm* — Studebaker & Brackett PC

(57) ABSTRACT

A vehicle control apparatus includes: a plurality of operation devices receive operations from an occupant; a plurality of driving devices operate a vehicle with operation quantities applied to the plurality of operation devices; and a control device controls the plurality of driving devices. The control device includes: first and second operating characteristics; and correction device. When the occupant operates the second operation devices during execution of operation of the first operation devices, the correction device corrects the second operating characteristics such that the second operation force at the second response start point is equivalent to the first operation force of the first operation devices obtained when the operation of the second operation devices is started.

6 Claims, 11 Drawing Sheets

(51) Int. Cl.
*B60W 10/184* (2012.01)
*B60W 50/00* (2006.01)
*B60K 26/02* (2006.01)
*B60T 8/1755* (2006.01)
*B60T 13/66* (2006.01)
*B60W 50/16* (2012.01)
*B62D 5/00* (2006.01)
*B60T 7/04* (2006.01)
*B62D 3/12* (2006.01)
*B62D 5/04* (2006.01)

(52) U.S. Cl.
CPC ......... *B60T 13/662* (2013.01); *B60W 10/184* (2013.01); *B60W 10/20* (2013.01); *B60W 50/0098* (2013.01); *B60W 50/16* (2013.01); *B62D 5/005* (2013.01); *B60T 2260/02* (2013.01); *B60T 2270/82* (2013.01); *B60W 2050/0075* (2013.01); *B60W 2540/10* (2013.01); *B60W 2540/12* (2013.01); *B60W 2540/18* (2013.01); *B62D 3/12* (2013.01); *B62D 5/04* (2013.01)

(58) Field of Classification Search
CPC ... B60K 26/021; B60T 7/042; B60T 8/17555; B60T 13/662
USPC .......................................................... 701/41
See application file for complete search history.

(56) References Cited

U.S. PATENT DOCUMENTS

| | | | |
|---|---|---|---|
| 2008/0294301 A1* | 11/2008 | Kaigawa | B60W 10/06 701/1 |
| 2012/0123655 A1 | 5/2012 | Kurata | |
| 2015/0039198 A1* | 2/2015 | Takeuchi | B60T 7/042 701/70 |
| 2015/0291210 A1* | 10/2015 | Kageyama | B60T 8/1755 701/41 |

FOREIGN PATENT DOCUMENTS

| | | |
|---|---|---|
| CN | 203832404 U | 9/2014 |
| JP | 4211056 B2 | 1/2009 |
| JP | 2011-143915 A | 7/2011 |
| JP | 2015-214295 A | 12/2015 |
| WO | 2011/013250 A1 | 2/2011 |

OTHER PUBLICATIONS

An Office Action issued by the Chinese Patent Office on Feb. 15, 2019, which corresponds to Chinese Patent Application No. 201710341482.0 and is related to U.S. Appl. No. 15/594,701 with English Translation.

* cited by examiner

VEHICLE CONTROL APPARATUS FOR CONTROLLING CONTINUOUS COOPERATIVE OPERATION OF PLURALITY OF OPERATION DEVICES

TECHNICAL FIELD

The present invention relates to a vehicle control apparatus.

BACKGROUND ART

Conventional vehicle control involves setting a target operation quantity on the basis of operating characteristics (control map) and controlling the behavior and operation of a vehicle. The operating characteristics (control map) define a correlation between an operation quantity of operation devices (such as accelerator pedal) and an operation quantity (such as acceleration) of the vehicle when an occupant operates the operation devices.

In order to improve an operation feeling of an occupant, a large number of control apparatuses configured to perform vehicle control suited for sensibility of the occupant on the basis of psychophysics have been proposed.

Fechner's law and Stevens' law are known as laws that express the relation between physical quantity and sensory quantity (perception quantity) in the form of functions. Fechner's law states that the sensory quantity is proportional to the logarithm of stimulus intensity, and Stevens' law states that the sensory quantity is proportional to the power of stimulus intensity.

A vehicle control apparatus disclosed in Japanese Unexamined Patent Publication No. 2011-143915 includes an acceleration generation device configured to generate an acceleration to a vehicle and a control device configured to control the acceleration generation device on the basis of an accelerator opening degree corresponding to an accelerator pedal operation by an occupant and a vehicle speed. In the vehicle control apparatus, the relation between the accelerator opening degree and a request acceleration is changed on the basis of a minimum generation acceleration that can be generated by the acceleration generation device while maintaining predetermined characteristics.

A vehicle power steering apparatus disclosed in Japanese Unexamined Patent Publication No. 2015-214295 includes a steering angle sensor, a steering torque sensor, and a control unit configured to control assist power for an electric motor so as to achieve target steering force characteristics defined by a plurality of characteristic elements. In the vehicle power steering apparatus, the control unit includes a sensory quantity setting unit configured to set a plurality of sensory quantities to be estimated to act on an occupant, and a steering force setting unit configured to set target steering force characteristics by converting the plurality of sensory quantities set by the sensory quantity setting unit into physical quantities of a plurality of characteristic elements.

In recent years, vehicles employing a by-wire system have been put into practical use. A vehicle employing a by-wire system includes operation devices to be operated by an occupant, an actuator (reaction motor) for applying an operation reaction force (operation force by the occupant) to the operation devices, and driving devices for operating the vehicle in accordance with an operation quantity of the operation devices.

In the vehicle employing the by-wire system, the operation devices and the driving devices are not mechanically coupled to each other, but an actual vehicle behavioral operation, an operation quantity of operation devices, and an operation force by the occupant are configured as independent elements that are mechanically separated from one another.

In general, vehicle driving involves a transition of driving states in the order of environment recognition by an occupant, situation judgment by the occupant, device operation by the occupant, and response operation by the vehicle.

Recognition, judgement, and operation are elements that are mainly judged by a sensory region (within brain) of the occupant, and the response quantity (responsiveness) of the vehicle is an element that is mainly judged by a physical region (reality).

Specifically, there may be difference between a perception quantity which is perceived by the occupant through visual sensation and somatic sensation and a physical quantity with which the vehicle actually behaves, and there may be difference between a perception quantity which is perceived by the occupant through somatic sensation and a physical quantity with which operation devices actually acts on four limbs and the like.

Therefore, in the situation where the occupant operates operation devices of the vehicle, it is necessary to appropriately apply an operation force that takes sensory characteristics of the occupant into consideration to the occupant on the basis of mechanical characteristics of human four limbs.

The vehicle control apparatus disclosed in Japanese Unexamined Patent Publication No. 2011-143915 generates, on the basis of Fechner's law, an acceleration feeling adapted to sensibility of an occupant with respect to an operation quantity of the accelerator pedal.

The vehicle power steering apparatus disclosed in Japanese Unexamined Patent Publication No. 2015-214295 adjusts, on the basis of Fechner's law, a steering feeling by using an operation feeling of the steering wheel.

The technologies disclosed in Japanese Unexamined Patent Publication Nos. 2011-143915 and 2015-214295, however, have the following problems when a plurality of operation devices are continuously operated in a cooperative manner.

Vehicle driving involves many situations where a plurality of operation devices are continuously operated in a cooperative manner.

For example, vehicle turning travel involves a pedaling operation of a brake pedal and start of steering of a steering wheel during the pedaling operation of the brake pedal in the initial stage of turning and start of pedaling of an accelerator pedal during the steering operation of the steering wheel in the later stage of turning.

Specifically, in a turning initial stage in turning travel of the vehicle, in a state in which a predetermined operation force (pedaling force) in response to the pedaling operation of the brake pedal acts on the leg of the occupant, the occupant starts operation the steering wheel with a low operation force (steering force). Accordingly, the occupant may feel uncomfortable due to the difference in operation force, resulting in increased driving load.

In a turning later stage in turning travel of the vehicle, in a state in which a predetermined operation force (steering force) in response to the steering operation of the steering wheel acts on the arm of the occupant, the occupant starts operating the accelerator pedal with a low operation force (pedaling force). Accordingly, the occupant may feel uncomfortable due to the difference in operation force, resulting in increased driving load.

In other words, in the technologies disclosed in Japanese Unexamined Patent Publication Nos. 2011-143915 and 2015-214295, an operation force of single operation devices can be adapted to the sensibility of the occupant, but the occupant cannot feel a fully comfortable operation feeling when the occupant continuously operates a plurality of operation devices in a cooperative manner.

SUMMARY OF INVENTION

It is an object of the present invention to provide a vehicle control apparatus capable of improving comfortability in a continuous cooperative operation of a plurality of operation devices.

A vehicle control apparatus according to one aspect of the present invention includes: a plurality of operation devices; a plurality of driving devices; and a control device. The plurality of operation devices receive operations from an occupant. The plurality of driving devices operate a vehicle with operation quantities applied to the plurality of operation devices. The control device controls the plurality of driving devices.

The control device includes: first operating characteristics and second operating characteristics; and correction device. In the first operating characteristics and the second operating characteristics, correlations between a first operation force and a second operation force respectively corresponding to a first operation quantity and a second operation quantity of first operation devices and second operation devices included in the plurality of operation devices, and an operation quantity of the vehicle are defined, respectively. The first operating characteristics and the second operating characteristics include a first response start point and a second response start point at which the vehicle starts behavioral operations in response to the first operation force and the second operation force, respectively. The correction device is capable of correcting the first operating characteristics and the second operating characteristics.

In this aspect, when the occupant operates the second operation devices during execution of operation of the first operation devices, the correction device corrects the second operating characteristics such that the second operation force at the second response start point is equivalent to the first operation force of the first operation devices obtained when the operation of the second operation devices is started.

The vehicle control apparatus according to the aspect can control an operation tendency of first operation devices to be linearly connected to an operation tendency of second operation devices, thereby improving comfortability in a continuous cooperative operation of a plurality of operation devices.

DESCRIPTION OF EMBODIMENTS

Embodiments

Referring to FIGS. 1 to 11, a control apparatus 1 for a vehicle V according to embodiments is described below.

The embodiments described below exemplify a control apparatus 1 applied to a vehicle V including a steering by-wire mechanism S, an accelerator by-wire mechanism A, and a brake by-wire mechanism B, and are not intended to limit the present invention, its applications, or its purposes.

Figure 1:
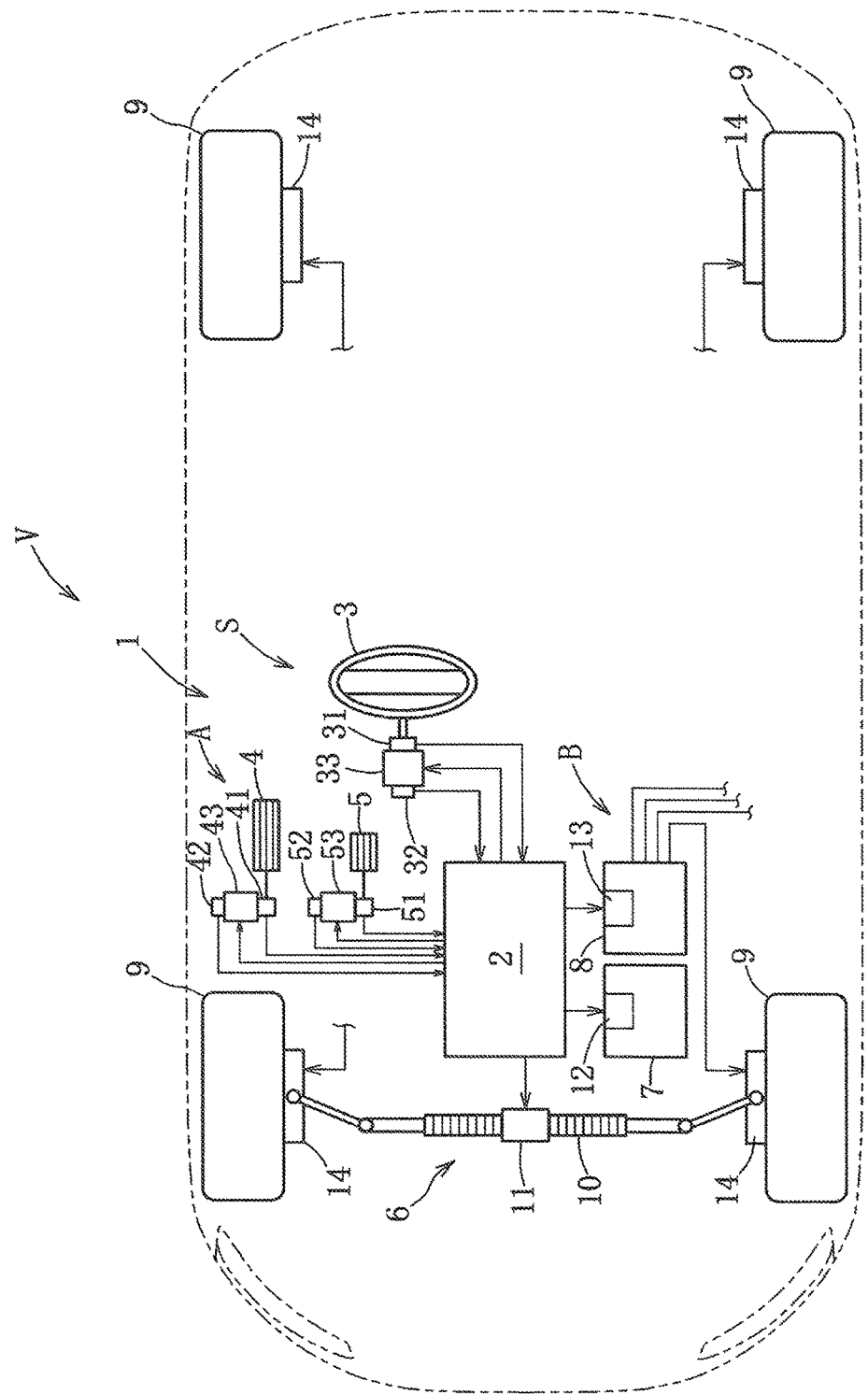
FIG. 1 is an overall schematic view illustrating a configuration of a control apparatus 1 for a vehicle V according to embodiments.

As illustrated in FIG. 1, a control apparatus 1 for a vehicle V includes a steering by-wire mechanism S, an accelerator by-wire mechanism A, a brake by-wire mechanism B, an electronic control unit (ECU) 2, and other devices.

In the control apparatus 1 for the vehicle V, the ECU 2 is provided as control device.

The vehicle V includes a steering wheel (hereinafter abbreviated as "steering") 3 as arm system operation devices, and an accelerator pedal (hereinafter abbreviated as "accelerator") 4 and a brake pedal (hereinafter abbreviated as "brake") 5 as leg system operation devices. The vehicle V further includes a steering device 6, an engine 7, a brake device 8, and two pairs of front and rear wheels 9.

First, the steering by-wire mechanism S is described.

Figure 2:
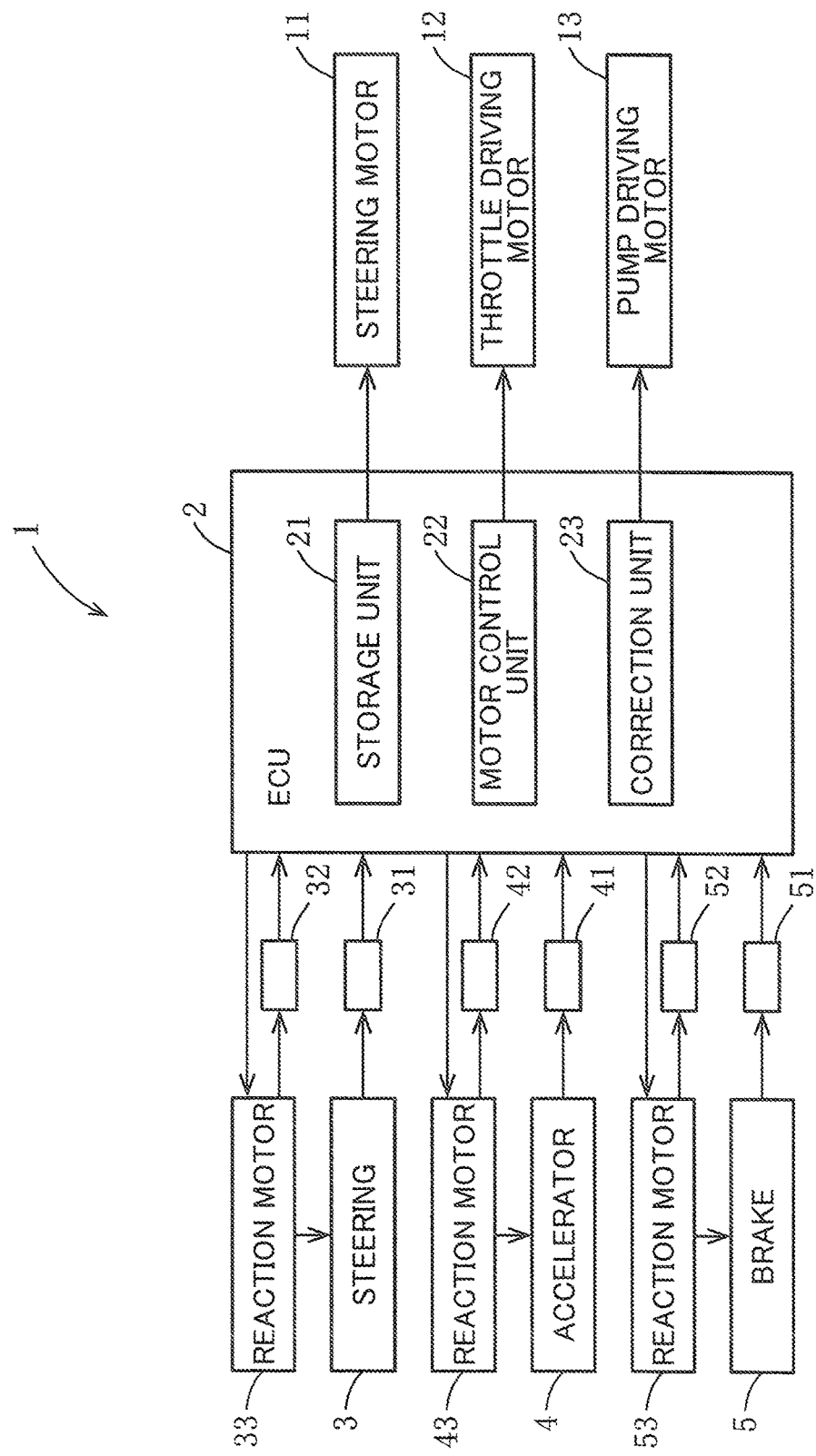
FIG. 2 is a block diagram illustrating a configuration of the control apparatus 1.

As illustrated in FIGS. 1 and 2, the steering by-wire mechanism S is configured by mechanically separating the steering 3 and the steering device 6 that serves as turning driving devices for a pair of right and left front wheels 9.

The steering by-wire mechanism S includes the steering 3, an operation quantity sensor 31 configured to detect an operation quantity (steering angle) of the steering 3 by an occupant, an operation force sensor 32 configured to detect an operation force (steering torque) corresponding to the operation quantity of the steering 3, and a reaction motor 33 configured to apply an operation force, which is an operation reaction force, to the steering 3 on the basis of the operation quantity of the steering 3.

The steering device 6 includes a steering rod 10 with a rack, which is coupled to each of the pair of right and left front wheels 9 via link mechanisms, and a steering motor 11 having a pinion gear capable of driving the steering rod 10 in the horizontal direction. The steering device 6 is configured such that the steering rod 10 driven by the steering motor 11 steers the pair of right and left front wheels 9.

In the steering device 6, the steering motor 11 is provided as driving devices.

The steering motor 11, the operation quantity sensor 31, the operation force sensor 32, and the reaction motor 33 are each electrically connected to the ECU 2.

Next, the accelerator by-wire mechanism A is described.

As illustrated in FIGS. 1 and 2, the accelerator by-wire mechanism A is configured by mechanically separating the accelerator 4 and a throttle valve (not shown) of the engine 7.

The accelerator by-wire mechanism A includes the accelerator 4, an operation quantity sensor 41 configured to detect an operation quantity (pedaling amount) of the accelerator 4 by the occupant, an operation force sensor 42 configured to detect an operation force (pedaling force) corresponding to the operation quantity of the accelerator 4, and a reaction motor 43 configured to apply an operation force, which is an operation reaction force, to the accelerator 4 on the basis of the operation quantity of the accelerator 4.

The engine 7 includes a throttle driving motor 12 capable of rotationally driving the throttle valve. Through adjustment of an opening degree of the throttle valve driven by the throttle driving motor 12, the engine 7 controls an acceleration of the vehicle V.

In the engine 7, the throttle driving motor 12 is provided as driving devices.

The throttle driving motor 12, the operation quantity sensor 41, the operation force sensor 42, and the reaction motor 43 are each electrically connected to the ECU 2.

Next, the brake by-wire mechanism B is described.

As illustrated in FIGS. 1 and 2, the brake by-wire mechanism B is configured by mechanically separating the brake 5 and a hydraulic brake mechanism 14 capable of braking the wheel 9.

The brake by-wire mechanism B includes the brake 5, an operation quantity sensor 51 configured to detect an operation quantity of the brake 5 by the occupant, an operation force sensor 52 configured to detect an operation force (pedaling force) corresponding to the operation quantity of the brake 5, and a reaction motor 53 configured to apply an operation force, which is an operation reaction force, to the brake 5 on the basis of the operation quantity of the brake 5.

The hydraulic brake mechanism 14 includes a rotor disc provided to the wheel 9 so as to be rotatable integrally with the wheel 9, and a caliper capable of applying a braking force to the rotor disc (both not shown).

The brake device 8 includes a hydraulic pump that uses a pump driving motor 13 as a driving source, a pressurization valve, and a return valve. In the brake device 8, the hydraulic pump is connected to a cylinder provided to the caliper (all not shown). When a brake hydraulic pressure is supplied from the hydraulic pump to the cylinder, a piston presses a brake pad toward the rotor disc, thereby braking the vehicle V.

In the brake device 8, the pump driving motor 13 is provided as driving devices.

The pump driving motor 13, the operation quantity sensor 51, the operation force sensor 52, and the reaction motor 53 are each electrically connected to the ECU 2.

Next, the ECU 2 is described.

The ECU 2 includes a central processing unit (CPU), a ROM, a RAM, an IN-side interface, and an OUT-side interface.

In the ROM, various kinds of programs and data for implementing cooperative control are stored. The RAM is provided with a processing area used for the CPU to perform a series of processing.

When the occupant operates at least one operation devices among the steering 3, the accelerator 4, and the brake 5, the ECU 2 generates an operation reaction force of the corresponding motor among the motors 33, 43, and 53 on the basis of a correlation between an operation quantity of the operated operation devices and an operation force Fs, Fa, or Fb, and drives the corresponding motor among the motors 11 to 13 on the basis of operating characteristics L, M, or N, thereby controlling the behavioral operation of the vehicle V.

In the present embodiment, actual operation forces Fs, Fa, and Fb detected by the operation force sensors 32, 42, and 52 are converted into perception operation forces that are sensuously perceived by the occupant, and the converted perception operation forces are regarded as operation forces Fs, Fa, and Fb corresponding to operation quantities of the vehicle V in response to the respective motors 11 to 13, that is, operation forces Fs, Fa, and Fb in the operating characteristics L, M, and N.

For conversion into the perception operation force, because the sensory quantity is proportional to the logarithm of stimulus intensity (Fechner's law), the actual operation forces Fs, Fa, and Fb detected by the operation force sensors 32, 42, and 52 are converted by Expression (1):

$$y = k \log x + K \qquad (1)$$

where y is a sensory quantity (perception operation force), x is a physical quantity (detected actual operation force), and K is an integral constant. Consequently, the vehicle behavior suited to perception characteristics of the occupant can be achieved.

When the occupant operates second operation devices during the execution of operation of first operation devices, the ECU 2 corrects second operating characteristics such that a second operation force at a second response start point becomes a force equivalent to a first operation force of the first operation devices obtained when the operation of the second operation devices is started.

The first operation devices refers to any one operation devices that is operated by the occupant among the operation devices 3 to 5, and the second operation devices refers to operation devices other than the first operation devices among the operation devices 3 to 5. The second response start point refers to a start point at which the vehicle V starts behavioral operations in operating characteristics L, M, and N described later corresponding to the second operation devices among the operating characteristics L, M, and N.

The expression "force equivalent" is defined as the meaning of forces that include a force directed in one direction and a force (torque) directed in the rotational direction and are regarded as being identical physically, sensuously, or perceptually.

As illustrated in FIG. 2, the ECU 2 outputs an instruction signal to each of the motors 11 to 13 and the reaction motors 33, 43, and 53, and receives input of a detection signal from each of the operation quantity sensors 31, 41, and 51 and the operation force sensors 32, 42, and 52.

When the steering 3 is operated, the ECU 2 sets a flag fs to "1", and executes steering control processing for controlling the reaction motor 33 and the steering motor 11.

When the accelerator 4 is operated, the ECU 2 sets a flag fa to "1", and executes accelerator control processing for controlling the reaction motor 43 and the throttle driving motor 12.

When the brake 5 is operated, the ECU 2 sets a flag fb to "1", and executes brake control processing for controlling the reaction motor 53 and the pump driving motor 13.

When none of the operation devices 3 to 5 is operated, the ECU 2 sets the flags fs, fa, and fb to "0".

The ECU 2 includes a storage unit 21, a motor control unit 22, and a correction unit 23. The storage unit 21 stores the operating characteristics L, M, and N therein. The motor control unit 22 controls the reaction motors 33, 43, and 53 in accordance with the operation forces Fs, Fa, and Fb by the occupant. The correction unit 23 corrects, on the basis of the operation forces Fs, Fa, and Fb of operation devices 3 to 5 that have been precedingly operated, the operating characteristics L, M, and N of operation devices 3 to 5 that have been operated subsequently.

In the ECU 2, the correction unit 23 is provided as correction device.

Figure 3:
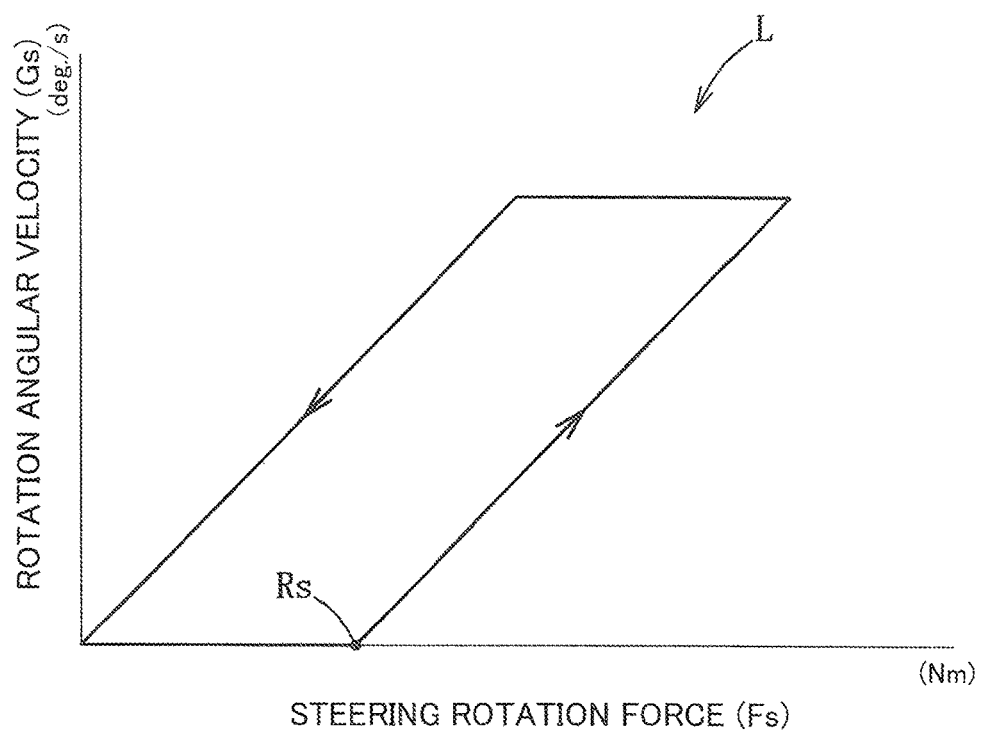
FIG. 3 is a characteristic diagram illustrating basic steering operating characteristics constructed by a correlation between a steering rotation force and a rotation angular velocity.

FIG. 3 illustrates the steering operating characteristics L serving as initial characteristics.

The steering operating characteristics L define a relation between the operation force Fs of the steering 3 and the target rotation angular velocity Gs on the basis of a correlation between the operation quantity of the steering 3 by the occupant and the rotation force (operation force) Fs of the steering 3 and a correlation between the operation quantity of the steering 3 by the occupant and the rotation angular velocity Gs of the vehicle V.

As illustrated in FIG. 3, the steering operating characteristics L serving as initial characteristics are set such that when the steering 3 is steered, the rotation angular velocity Gs is not generated on the vehicle V until the operation force Fs by the occupant reaches the response start point Rs in an outbound path (turning steering). In a region where the steering rotation force Fs exceeds the response start point Rs, the steering operating characteristics L have a linear tendency that the rotation angular velocity Gs of the vehicle V becomes larger as the operation force Fs by the occupant becomes larger.

In a return path (turning-back steering), the steering operating characteristics L serving as initial characteristics have a linear tendency that the rotation angular velocity of the vehicle V becomes smaller to be "0" as the operation force Fs by the occupant becomes smaller.

Figure 4:
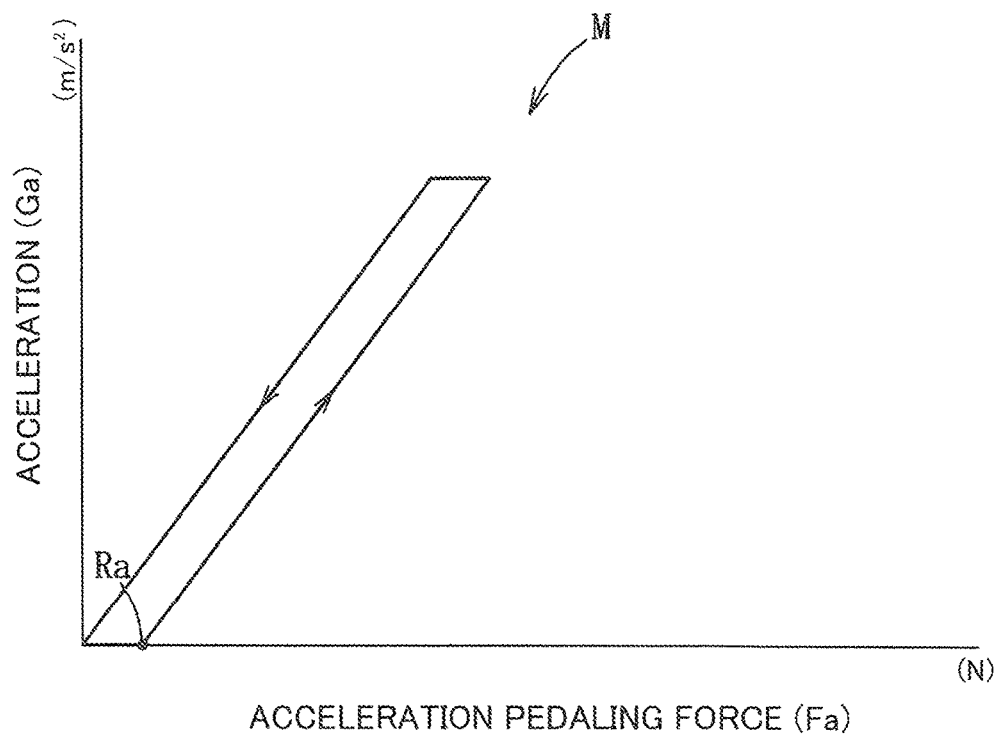
FIG. 4 is a characteristic diagram illustrating basic accelerator operating characteristics constructed by a correlation between an accelerator pedaling force and an acceleration.

FIG. 4 illustrates the accelerator operating characteristics M serving as initial characteristics.

The accelerator operating characteristics M define a relation between the operation force Fa of the accelerator 4 and the target acceleration Ga on the basis of a correlation between the operation quantity of the accelerator 4 by the occupant and the pedaling force (operation force) Fa of the accelerator 4 and a correlation between the operation quantity of the accelerator 4 by the occupant and the acceleration Ga of the vehicle V.

As illustrated in FIG. 4, the accelerator operating characteristics M serving as initial characteristics are set such that when the accelerator 4 is operated, the acceleration Ga is not generated on the vehicle V until the operation force Fa by the occupant reaches the response start point Ra in an outbound path (pedaling). In a region where the accelerator pedaling force Fa exceeds the response start point Ra, the accelerator operating characteristics M have a linear tendency that the acceleration Ga of the vehicle V becomes larger as the operation force Fa by the occupant becomes larger.

In a return path (pedal releasing), the accelerator operating characteristics M serving as initial characteristics have a linear tendency that the acceleration Ga of the vehicle V becomes smaller to be "0" as the operation force Fa by the occupant becomes smaller.

Figure 5:
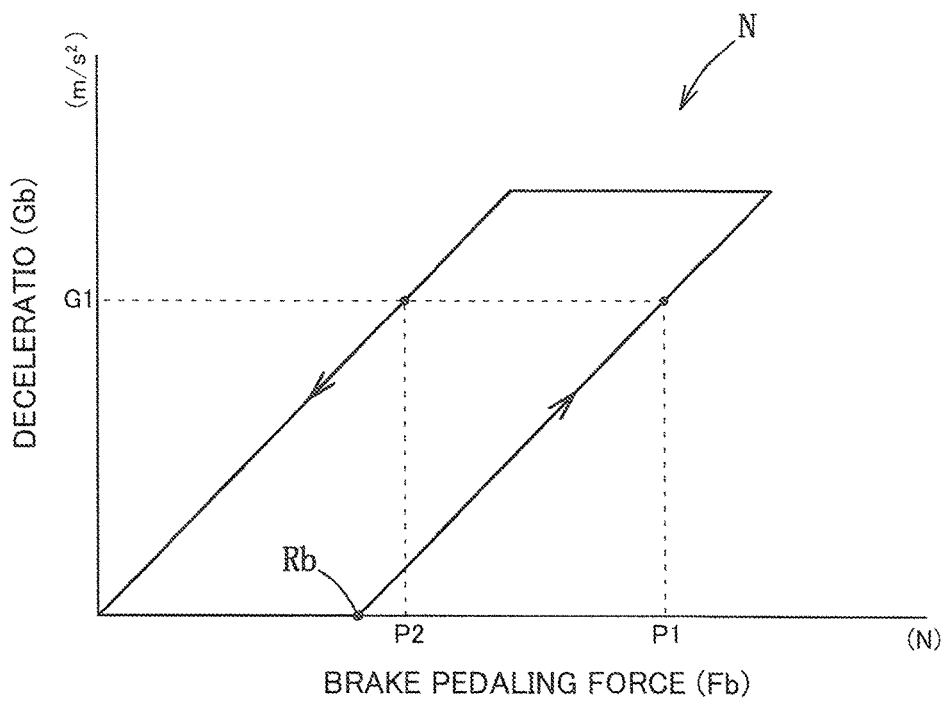
FIG. 5 is a characteristic diagram illustrating basic brake operating characteristics constructed by a correlation between a brake pedaling force and a deceleration.

FIG. 5 illustrates the brake operating characteristics N serving as initial characteristics.

The brake operating characteristics N define a relation between the operation force Fb of the brake 5 and the target deceleration Gb on the basis of a correlation between the operation quantity of the brake 5 by the occupant and the pedaling force (operation force) Fb of the brake 5 and a correlation between the operation quantity of the brake 5 by the occupant and the deceleration Gb of the vehicle V.

As illustrated in FIG. 5, the brake operating characteristics N serving as initial characteristics are set such that when the brake 5 is steered, the deceleration Gb is not generated on the vehicle V until the operation force Fb by the occupant reaches the response start point Rb in an outbound path (pedaling). In a region where the brake pedaling force Fb exceeds the response start point Rb, the brake operating characteristics N have a linear tendency that the deceleration Gb of the vehicle V becomes larger as the operation force Fb of the occupant becomes larger.

In a return path (pedal releasing), the brake operating characteristics N serving as initial characteristics have a linear tendency that the deceleration Gb of the vehicle V becomes smaller to be "0" as the operation force Fb by the occupant becomes smaller.

Next, the motor control unit 22 is described.

For driving control of the reaction motor 33, the motor control unit 22 controls a current I supplied to the reaction motor 33 such that the reaction motor 33 has a target operation force set in advance on the basis of the correlation between the operation quantity and the operation force Fs of the steering 3.

The motor control unit 22 receives input of a detection value detected by the operation force sensor 32. After noise of the detection value is cut by a filter (not shown), the motor control unit 22 calculates a reference target current Io based on the detection value with a predetermined control gain. The motor control unit 22 determines a deviation between a detection value detected by the operation force sensor 32 and an operation force value, which is a target, on the basis of the already-stored correlation between the operation quantity of the steering 3 and the operation force of the steering 3, calculates a compensation current If on the basis of the deviation and the control gain, and adds the reference target current Io and the compensation current If together to calculate a target current I supplied to the reaction motor 33.

The motor control unit 22 controls driving of the reaction motors 43 and 53 in the same manner as described above.

Next, the correction unit 23 is described.

When second operation devices 3 to 5 is operated during the execution of preceding operation of first operation devices 3 to 5, the correction unit 23 corrects the second operating characteristics L, M, and N to corrected operating characteristics LA, MA, and NA such that the second operation forces Fs, Fa, and Fb at the second response start points Rs, Ra, and Rb become forces equivalent to first operation forces Fs, Fa, and Fb of the first operation devices 3 to 5 obtained when the operation of the second operation devices 3 to 5 is started.

The correction unit 23 is specifically described by taking turning travel of the vehicle V as an example.

In a turning initial stage in turning travel of the vehicle V, the occupant presses the brake 5, and the steering operation of the steering 3 is started during the pedaling operation of the brake 5. Thus, in the turning initial stage of the vehicle V, the brake 5 corresponds to first operation devices, and the steering 3 corresponds to second operation devices.

As illustrated in FIG. 5, when the occupant presses the brake 5 with an operation force (pedaling force) P1, the vehicle V decelerates with a deceleration G1. When the occupant starts operating the steering 3 in this state, an operation force P2 acts on the leg of the occupant, but the operation force Fs at the second response start point Rs at which the vehicle V starts the behavioral operations is different from the operation force P2. Thus, the control based on the steering operating characteristics L makes the occupant feel uncomfortable.

Figure 6:
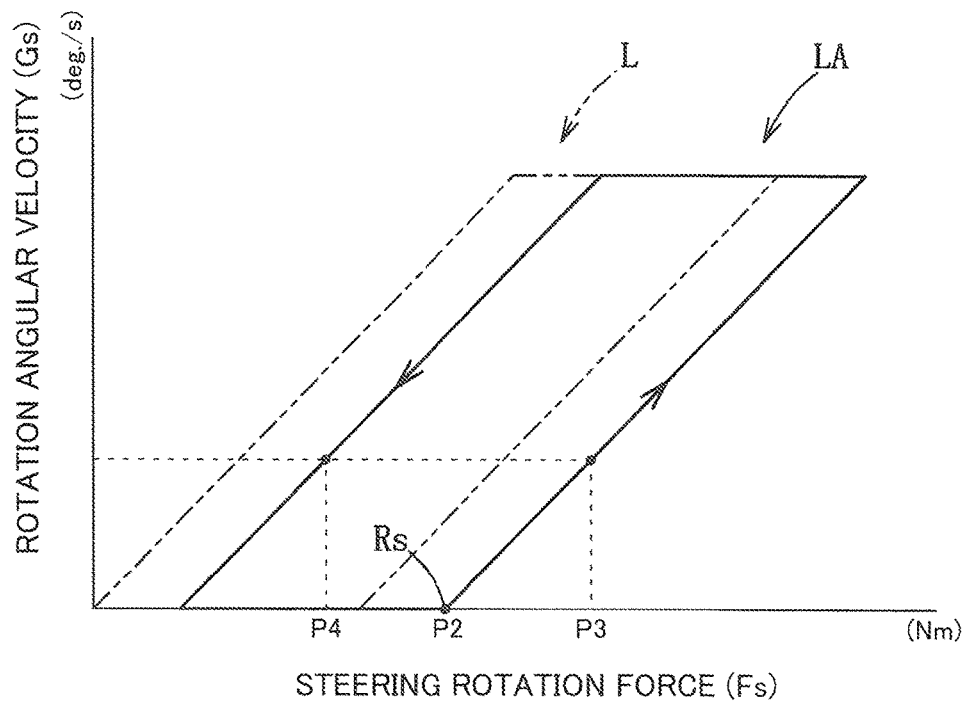
FIG. 6 is a characteristic diagram illustrating corrected steering operating characteristics.

In view of the above, in the present embodiment, as illustrated in FIG. 6, in order that the behavioral operations of the vehicle V in response to the operation of the steering 3 are started with the operation force P2, the steering operating characteristics L are translated such that the second response start point Rs matches the operation force P2 to set corrected steering operating characteristics LA.

In a turning later stage in turning travel of the vehicle V, the occupant steers the steering 3, and the pedaling operation of the accelerator 4 is started during the steering operation of the steering 3. Thus, in the turning later stage of the vehicle V, the steering 3 corresponds to first operation devices, and the accelerator 4 corresponds to second operation devices.

As illustrated in FIG. 6, when the occupant steers the steering 3 with an operation force (rotation force) P3, the vehicle V makes a turn with a rotation angular velocity G2. When the occupant starts operating the accelerator 4 in this state, an operation force P4 acts on the arm of the occupant, but the operation force Fa at the second response start point Ra at which the vehicle V starts behavioral operations is different from the operation force P4. Thus, the control based on the basic accelerator operating characteristics M makes the occupant feel uncomfortable.

Figure 7:
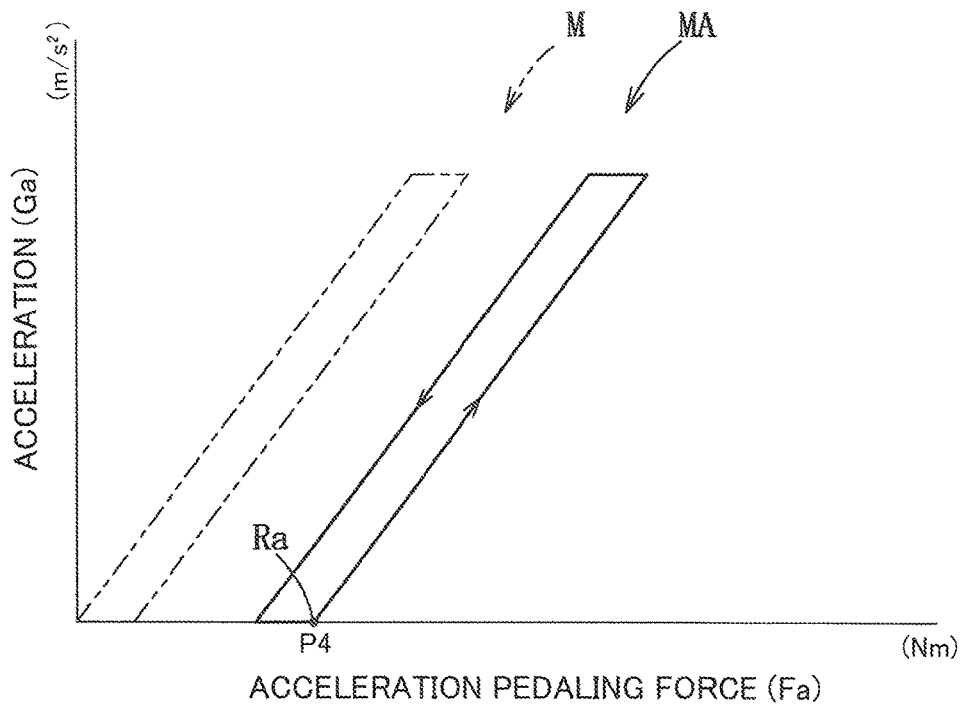
FIG. 7 is a characteristic diagram illustrating corrected accelerator operating characteristics.

In view of the above, in the present embodiment, as illustrated in FIG. 7, in order that the behavioral operations of the vehicle V in response to the operation of the accelerator 4 are started with the operation force P4, the basic accelerator operating characteristics M are translated such that the second response start point Ra matches the operation force P4 to set corrected accelerator operating characteristics MA.

Referring to flowcharts in FIGS. 8 to 11, a cooperative control processing procedure executed by the ECU 2 as control device is next described. Si (i=1, 2 . . . ) indicates a step for each processing.

Figure 8:
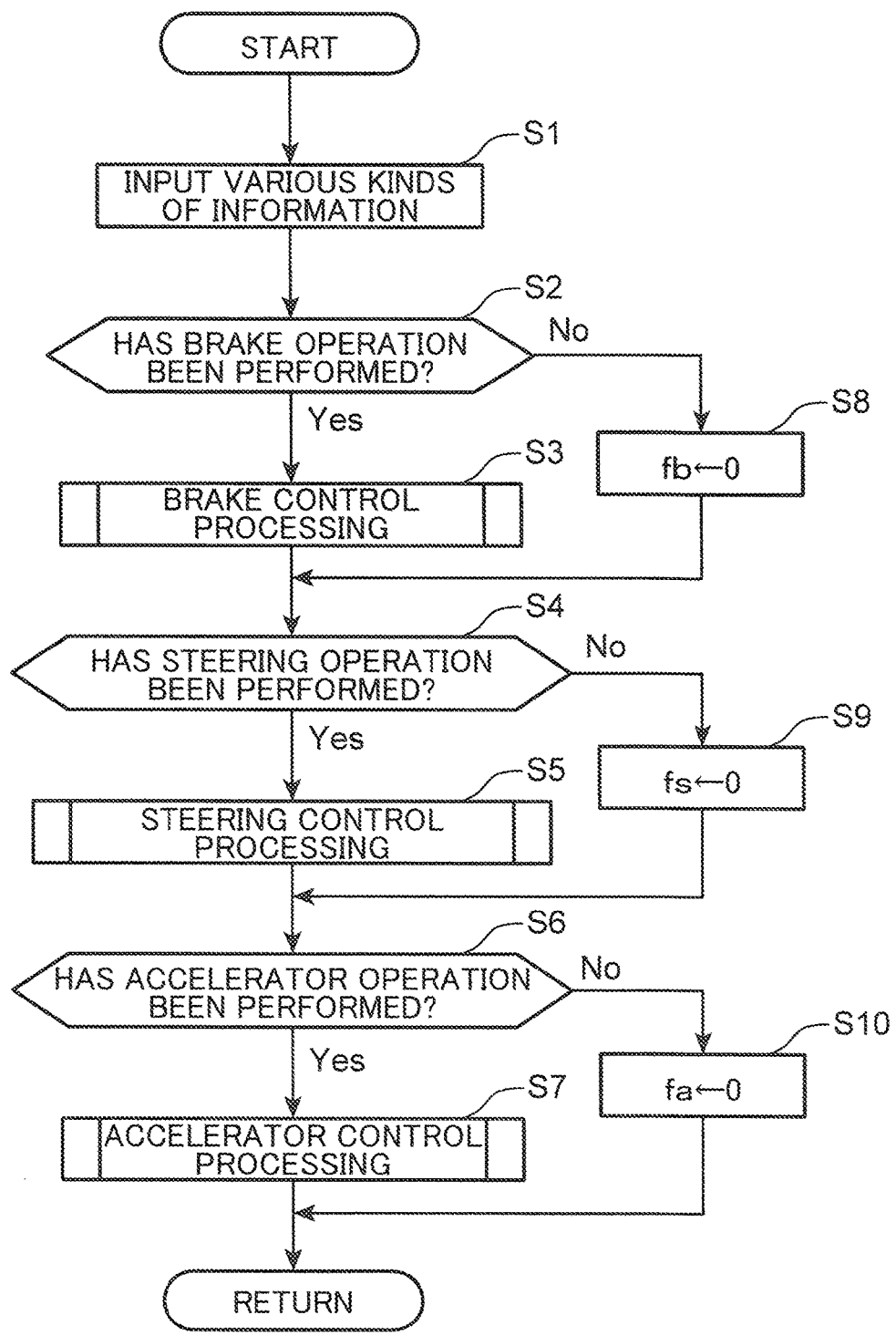
FIG. 8 is a flowchart illustrating a cooperative control processing procedure.

As illustrated in the flowchart in FIG. 8, in cooperative control processing, in Step S1, the ECU 2 first reads information such as detection value of each sensor and operating characteristics. The flow proceeds to Step S2.

In Step S2, the ECU 2 determines whether the occupant has operated the brake 5.

When the ECU 2 determines that the brake 5 has been operated as a result of the determination in Step S2, the flow proceeds to Step S3, and the ECU 2 executes brake control processing. When determining that the brake 5 has not been operated as a result of the determination in Step S2, the ECU 2 sets the flag fb to "0" (Step S8). The flow proceeds to Step S4.

In Step S4, the ECU 2 determines whether the occupant has operated the steering 3.

When the ECU 2 determines that the steering 3 has been operated as a result of the determination in Step S4, the flow proceeds to Step S5, and the ECU 2 executes steering control processing. When determining that the steering 3 has not been operated as a result of the determination in Step S4, the ECU 2 sets the flag fs to "0" (Step S9). The flow proceeds to Step S6.

In Step S6, the ECU 2 determines whether the occupant has operated the accelerator 4.

When the ECU 2 determines that the accelerator 4 has been operated as a result of the determination in Step S6, the flow proceed to Step S7. The ECU 2 executes accelerator control processing, and the flow returns. When determining that the accelerator 4 has not been operated as a result of the determination in Step S6, the ECU 2 sets the flag fa to "0" (Step S10), and the flow returns.

Figure 9:
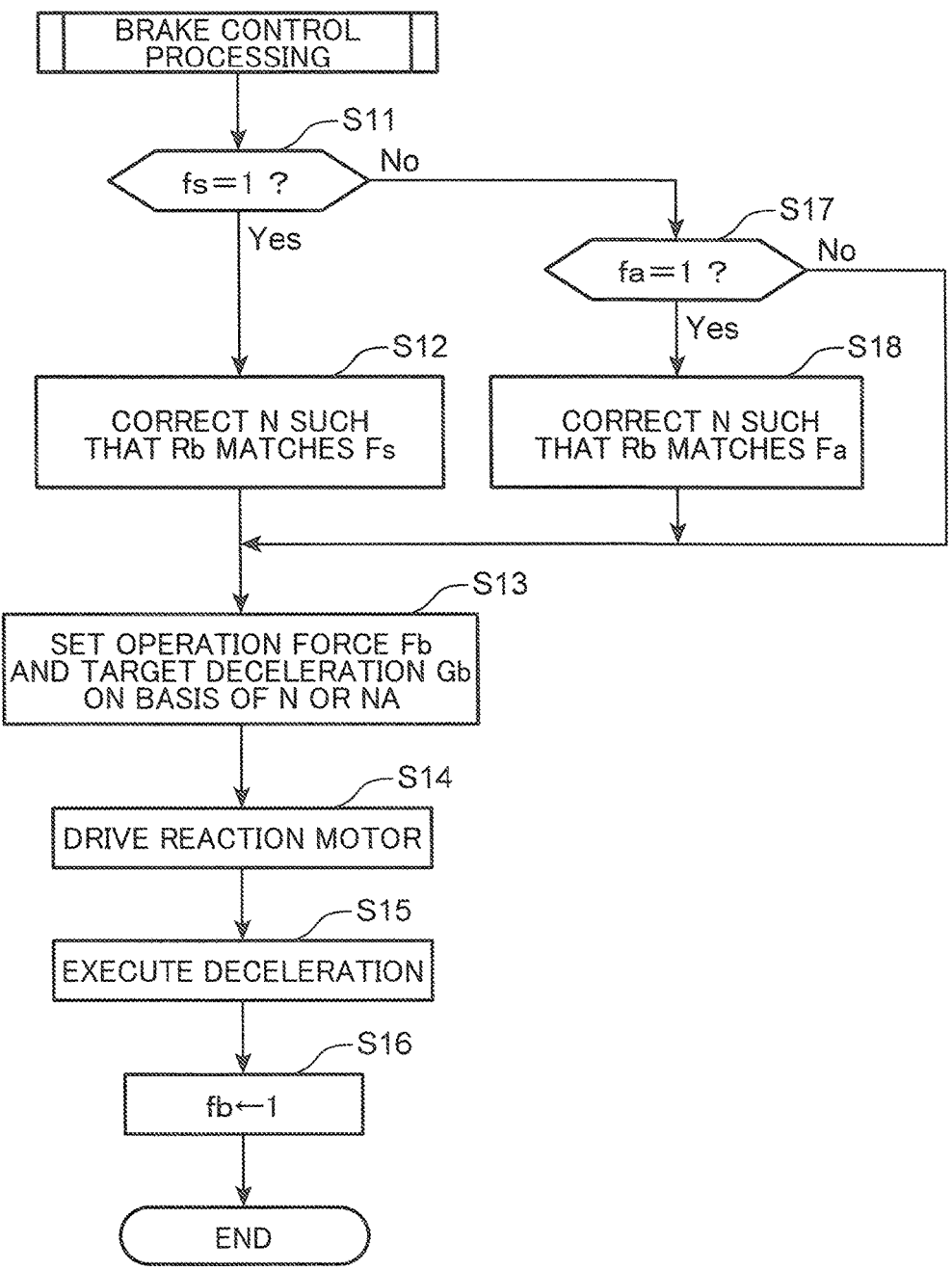
FIG. 9 is a flowchart illustrating a brake control processing procedure.

Referring to the flowchart in FIG. 9, a brake control processing procedure executed by the ECU 2 as control device is next described.

First, in Step S11, the ECU 2 determines whether the flag fs is "1".

When determining that the flag fs is "1" as a result of the determination in Step S11, which indicates that the steering 3 has already been operated, the ECU 2 translates the brake operating characteristics N such that the response start point Rb matches the operation force Fs to set the corrected brake operating characteristics NA (Step S12). The flow proceeds to Step S13.

In Step S13, the ECU 2 sets a target brake operation force Fb on the basis of the occupant operation quantity, and sets a target deceleration Gb on the basis of the brake operating characteristics N (corrected brake operating characteristics NA when the correction has been performed). The flow proceeds to Step S14.

In Step S14, the ECU 2 drives the reaction motor 53 on the basis of the target brake operation force Fb. The flow proceeds to Step S15.

In Step S15, the ECU 2 drives the pump driving motor 13 on the basis of the target deceleration Gb, and sets the flag fb to "1" (Step S16). The flow ends.

When the ECU 2 determines that the flag fs is "0" as a result of the determination in Step S11, the flow proceeds to Step S17, and the ECU 2 determines whether the flag fa is "1".

When determining that the flag fa is "1" as a result of the determination in Step S17, which indicates that the accelerator 4 has already been operated, the ECU 2 translates the brake operating characteristics N such that the response start point Rb matches the operation force Fa to set the corrected brake operating characteristics NA (Step S18). The flow proceeds to Step S13.

When determining that the flag fa is "0" as a result of the determination in Step S17, the ECU 2 does not correct the brake operating characteristics N, and the flow proceeds to Step S13.

Figure 10:
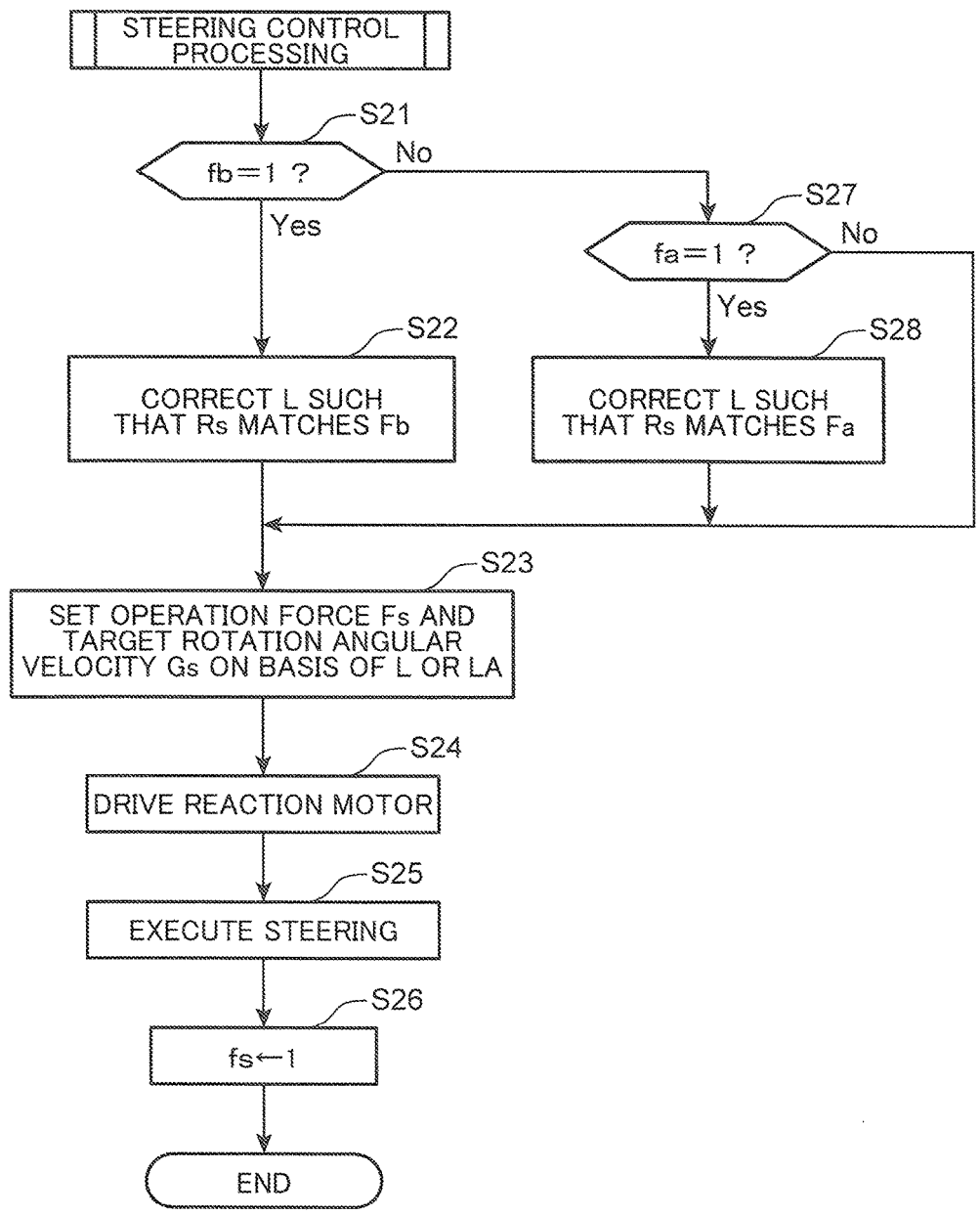
FIG. 10 is a flowchart illustrating a steering control processing procedure.

Referring to the flowchart in FIG. 10, a steering control processing procedure executed by the ECU 2 as control device is next described.

First, in Step S21, the ECU 2 determines whether the flag fb is "1".

When determining that the flag fb is "1" as a result of the determination in Step S21, which indicates that the brake 5 has been operated, the ECU 2 translates the steering operating characteristics L such that the response start point Rs matches the operation force Fb to set the corrected brake operating characteristics LA (Step S22). The flow proceeds to Step S23.

In Step S23, the ECU 2 sets a target steering operation force Fs on the basis of the occupant operation quantity, and sets a target rotation angular velocity Gs on the basis of the steering operating characteristics L (corrected steering operating characteristics LA when the correction has been performed). The flow proceeds to Step S24.

In Step S24, the ECU 2 drives the reaction motor 33 on the basis of the target steering operation force Fs. The flow proceeds to Step S25.

In Step S25, the ECU 2 drives the steering motor 11 on the basis of the target rotation angular velocity Gs, and sets the flag fs to "1" (Step S26). The flow ends.

When the ECU 2 determines that the flag fb is "0" as a result of the determination in Step S21, the flow proceeds to Step S27, and the ECU 2 determines whether the flag fa is "1".

When determining that the flag fa is "1" as a result of the determination in Step S27, which indicates that the accelerator 4 has already been operated, the ECU 2 translates the steering operating characteristics L such that the response start point Rs matches the operation force Fa to set the corrected brake operating characteristics LA (Step S28). The flow proceeds to Step S23.

When determining that the flag fa is "0" as a result of the determination in Step S27, the ECU 2 does not correct the steering operating characteristics L, and the flow proceeds to Step S23.

Figure 11:
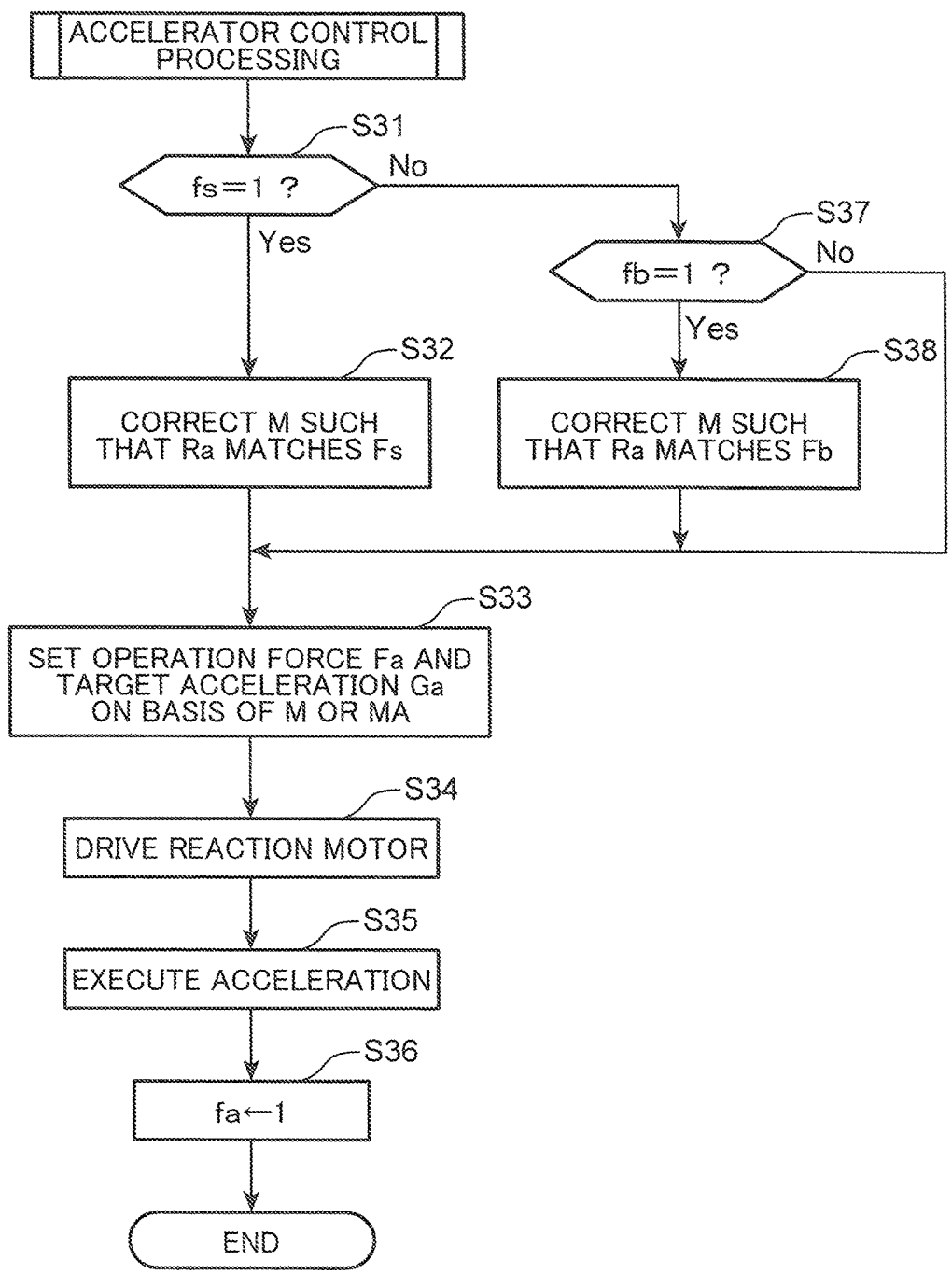
FIG. 11 is a flowchart illustrating an accelerator control processing procedure.

Referring to the flowchart in FIG. 11, an accelerator control processing procedure executed by the ECU 2 as control device is next described.

First, in Step S31, the ECU 2 determines whether the flag fs is "1".

When determining that the flag fs is "1" as a result of the determination in Step S31, which indicates that the steering 3 has already been operated, the ECU 2 translates the accelerator operating characteristics M such that the response start point Ra matches the operation force Fs to set the corrected accelerator operating characteristics MA (Step S32). The flow proceeds to Step S33.

In Step S33, the ECU 2 sets a target accelerator operation force Fa on the basis of the occupant operation quantity, and sets a target acceleration Ga on the basis of the accelerator operating characteristics M (corrected accelerator operating characteristics MA when the correction has been performed). The flow proceeds to Step S34.

In Step S34, the ECU 2 drives the reaction motor 43 on the basis of the target accelerator operation force Fa. The flow proceeds to Step S35.

In Step S35, the ECU 2 drives the throttle driving motor 12 on the basis of the target acceleration Ga, and sets the flag fa to "1" (Step S36). The flow ends.

When the ECU 2 determines that the flag fs is "0" as a result of the determination in Step S31, the flow proceeds to Step S37, and the ECU 2 determines whether the flag fb is "1".

When determining that the flag fb is "1" as a result of the determination in Step S37, which indicates that the brake 5 has already been operated, the ECU 2 translates the accelerator operating characteristics M such that the response start point Ra matches the operation force Fb to set the corrected accelerator operating characteristics MA (Step S38). The flow proceeds to Step S33.

When determining that the flag fa is "0" as a result of the determination in Step S37, the ECU 2 does not correct the accelerator operating characteristics M, and the flow proceeds to Step S33.

Next, the operations and effects provided by the control apparatus 1 for the vehicle V according to the present embodiment are described.

The control apparatus 1 for the vehicle V controls the second operation forces Fs, Fa, and Fb of the second operation devices 3 to 5 at the second response start points Rs, Ra, and Rb to be continuous to the first operation forces Fs, Fa, and Fb caused by the operation of the first operation devices 3 to 5. Consequently, the control apparatus 1 for the vehicle V can control an operation tendency of first operation devices 3 to 5 and an operation tendency of second operation devices 3 to 5, which are perceived by the occupant as operation reaction forces, to be linearly connected to each other, thereby eliminating an uncomfortable operation feeling of the occupant.

In the control apparatus 1 for the vehicle V, the plurality of operation devices are leg system operation devices and arm system operation devices. The leg system operation devices include the accelerator 4 and the brake 5, and the arm system operation devices include the steering 3. Consequently, the control apparatus 1 for the vehicle V can eliminate an uncomfortable operation feeling in a cooperative operation related to a traveling operation, a turning operation, and a braking operation.

In a turning initial stage in turning travel of the vehicle V, the brake 5 is first operation devices and the steering 3 is second operation devices. Consequently, the control apparatus 1 for the vehicle V can control the operation force Fs of the steering 3 at the response start point Rs to be continuous to the operation force Fb caused by the operation of the brake 5, thereby eliminating an uncomfortable feeling due to the difference in operation force in the turning initial stage.

In a turning later stage in turning travel of the vehicle V, the steering 3 is first operation devices and the accelerator 4 is second operation devices. Consequently, the control apparatus 1 for the vehicle V can control the operation force Fa of the accelerator 4 at the response start point Ra to be continuous to the operation force Fs caused by the operation of the steering 3, thereby eliminating an uncomfortable feeling due to the difference in operation force in the turning later stage.

Modifications

Next, modifications obtained by partially modifying the embodiment, which provide the same effects as described above, are described.

(1) While in the embodiment, the brake 5 and the accelerator 4 are exemplified as leg system operation devices and the steering 3 is exemplified as arm system operation devices, one of the brake and the accelerator may be leg system operation devices, and a shift lever or command switches of various kinds of operation devices may be included as arm system operation devices.

(2) While in the embodiment, an example in which translation is performed such that the response start point in the operating characteristics in the subsequent operation (operation performed subsequently to preceding operation) matches the operation force (or corrected operation force) of the preceding operation has been described, the return path may be fixed and only the outbound path may be translated such that the response start point in the operating characteristics matches an operation force of preceding operation (operation performed precedingly among plurality of operations executed subsequently). Consequently, the operation feeling in the return path can be maintained.

(3) While in the embodiment, an example in which the behavioral operations of the vehicle are controlled such that a perception operation force that is sensuously perceived by the occupant is regarded as an operation force in operating characteristics has been described, the behavioral operations of the vehicle may be controlled on the basis of an operation force by the occupant actually detected by an operation force sensor and operating characteristics.

(4) The present invention can be carried out in other forms obtained by variously modifying the embodiment by a person skilled in the art without departing from the gist of the present invention, and the present invention encompasses such modifications.

SUMMARY

The features of the embodiment are summarized as follows.

A vehicle control apparatus according to one aspect includes: a plurality of operation devices; a plurality of driving devices; and a control device. The plurality of operation devices receive operations from an occupant. The plurality of driving devices operate a vehicle with operation quantities applied to the plurality of operation devices. The control device controls the plurality of driving devices.

The control device include: first operating characteristics and second operating characteristics; and correction device. In the first operating characteristics and the second operating characteristics, correlations between a first operation force and a second operation force respectively corresponding to a first operation quantity and a second operation quantity of first operation devices and second operation devices included in the plurality of operation devices, and an operation quantity of the vehicle are defined, respectively. The first operating characteristics and the second operating characteristics include a first response start point and a second response start point at which the vehicle starts behavioral operations in response to the first operation force and the second operation force, respectively. The correction device is capable of correcting the first operating characteristics and the second operating characteristics.

In this aspect, when the occupant operates the second operation devices during execution of operation of the first operation devices, the correction device corrects the second operating characteristics such that the second operation force at the second response start point is equivalent to the first operation force of the first operation devices obtained when the operation of the second operation devices is started.

The vehicle control apparatus controls the second operation force of the second operation devices at the second response start point to be continuous to the first operation force caused by the operation of the first operation devices. Consequently, the vehicle control apparatus can control an operation tendency of the first operation devices and an operation tendency of the second operation devices, which are perceived by the occupant as operation reaction forces, to be linearly continuous, thereby eliminating an uncomfortable operation feeling of the occupant.

The vehicle control apparatus according to another aspect has the configuration in which the plurality of operation devices include leg system operation devices capable of being operated with a foot/leg and arm system operation devices capable of being operated with a hand/arm, the leg system operation devices includes an accelerator pedal and a brake pedal, and the arm system operation devices includes a steering wheel.

This configuration can eliminate an uncomfortable operation feeling of a cooperative operation related to a traveling operation, a turning operation, and a braking operation.

The vehicle control apparatus according to another aspect has the configuration in which, in a turning initial stage in turning travel of the vehicle, the first operation device is a brake pedal, and the second operation device is a steering wheel.

This configuration can control the operation force of the steering wheel at the response start point to be continuous to the operation force caused by the operation of the brake pedal, thereby eliminating an uncomfortable feeling due to the difference in operation force in the turning initial stage.

The vehicle control apparatus according to another aspect has the configuration in which, in a turning later stage in turning travel of the vehicle, the first operation device is a steering wheel, and the second operation device is an accelerator pedal.

This configuration can control the operation force of the accelerator pedal at the response start point to be continuous to the operation force caused by the operation of the steering wheel, thereby eliminating an uncomfortable feeling due to the difference in operation force in the turning later stage.

This application is based on Japanese Patent application No. 2016-099457 filed in Japan Patent Office on May 18, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A vehicle control apparatus, comprising:
   a plurality of operation devices that receive operations from an occupant;
   a plurality of driving devices that operate a vehicle with operation quantities applied to the plurality of operation devices; and
   a control device that controls the plurality of driving devices,
   wherein the control device includes:
   first operating characteristics and second operating characteristics in which correlations between a first operation force and a second operation force respectively corresponding to a first operation quantity and a second operation quantity of first operation devices and second operation devices included in the plurality of operation devices, and an operation quantity of the vehicle are defined, respectively, the first operating characteristics and the second operating characteristics including a first response start point and a second response start point at which the vehicle starts behavioral operations in response to the first operation force and the second operation force, respectively; and
   a correction device capable of correcting the first operating characteristics and the second operating characteristics, and
   wherein, when operations of the second operation devices are started during execution of operation of the first operation devices, the correction device corrects the second operating characteristics such that the second operation force at the second response start point is regulated so as to be equivalent to the first operation force of the first operation devices obtained when the operation of the second operation devices is started.

2. The vehicle control apparatus according to claim 1, wherein:
   the plurality of operation devices include leg system operation devices capable of being operated with a foot/leg and arm system operation devices capable of being operated with a hand/arm;
   the leg system operation devices include an accelerator pedal and a brake pedal; and
   the arm system operation devices include a steering wheel.

3. The vehicle control apparatus according to claim 2, wherein:

in a turning initial stage in turning travel of the vehicle,
at least one of the first operation devices is a brake pedal, and
at least one of the second operation devices is a steering wheel.

4. The vehicle control apparatus according to claim 2, wherein
in a turning later stage in turning travel of the vehicle,
at least one of the first operation devices is the steering wheel, and
at least one of the second operation devices is the accelerator pedal.

5. The vehicle control apparatus according to claim 1, wherein
in a turning initial stage in turning travel of the vehicle,
at least one of the first operation devices is a brake pedal, and
at least one of the second operation devices is a steering wheel.

6. The vehicle control apparatus according to claim 1, wherein
in a turning later stage in turning travel of the vehicle,
at least one of the first operation devices is a steering wheel, and
at least one of the second operation devices is an accelerator pedal.

* * * * *